United States Patent
Smith et al.

(10) Patent No.: US 9,152,632 B2
(45) Date of Patent: *Oct. 6, 2015

(54) INFORMATION MANAGEMENT SYSTEM

(75) Inventors: Robin Young Smith, Boston, MA (US); William Brian Ballard, Raleigh, NC (US)

(73) Assignee: PERKINELMER INFORMATICS, INC., Walthham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,446

(22) Filed: Jan. 26, 2012

(65) Prior Publication Data

US 2012/0296901 A1    Nov. 22, 2012

Related U.S. Application Data

(63) Continuation of application No. 12/199,651, filed on Aug. 27, 2008, now Pat. No. 8,126,899.

(51) Int. Cl.
*G06F 7/00* (2006.01)
*G06F 17/30* (2006.01)
*G06F 17/22* (2006.01)

(52) U.S. Cl.
CPC ...... *G06F 17/30011* (2013.01); *G06F 17/3071* (2013.01); *G06F 17/30557* (2013.01); *G06F 17/2276* (2013.01); *G06F 17/30286* (2013.01); *G06F 17/30566* (2013.01)

(58) Field of Classification Search
CPC .................. G06F 17/30011; G06F 17/30286; G06F 17/30557; G06F 17/30566; G06F 17/30235; G06F 17/2276
USPC ......... 707/755, 756, 758, 778, 792, 797, 798, 707/803, 805, 809
See application file for complete search history.

(56) References Cited

U.S. PATENT DOCUMENTS 4,554,631 A    11/1985 Reddington
6,763,499 B1    7/2004 Friedman et al.
(Continued)

FOREIGN PATENT DOCUMENTS

| EP | 1526471 A1 | 4/2005 |
|---|---|---|
| EP | 2567338 A1 | 3/2013 |
| GB | 2493830 A | 2/2013 |
| WO | WO-2007092842 A2 | 8/2007 |
| WO | WO-2011140148 A1 | 11/2011 |
| WO | WO-2013126077 A1 | 8/2013 |

OTHER PUBLICATIONS

Domon et al., Mass Spectrometry and Protein Analysis, Science, vol. 312, No. 5771, Apr. 14, 2006, pp. 212-217.
(Continued)

*Primary Examiner* — Tony Mahmoudi
*Assistant Examiner* — Merilyn Nguyen
(74) *Attorney, Agent, or Firm* — Choate, Hall & Stewart LLP

(57) ABSTRACT

An information management system creates data structures based entirely on the content of source files, then compares these data structures to discover synergies and commonalities. In one embodiment, the system accepts a first collection of source files, and extracts text from each source file. The text is compared to tags in one or more dictionaries, which comprise hierarchical listing of tags. Tags matching the text are associated with each source file. The system then generates a virtual relational network in which each source file having matching tags is a node. Tags associated with two or more source files are links between the nodes. This virtual relational network may be compared with another virtual relational network to discover common nodes or links. Source files later added to a collection are massively linked by associating all tags from all source files with the newly added source file, and vice versa.

22 Claims, 3 Drawing Sheets

(56) References Cited

U.S. PATENT DOCUMENTS

| | | | |
|---|---|---|---|
| 6,886,130 | B1* | 4/2005 | Unger et al. .................. 715/207 |
| 7,250,950 | B2 | 7/2007 | Smith et al. |
| 7,386,450 | B1 | 6/2008 | Baumgartner et al. |
| 7,650,327 | B2 | 1/2010 | Remsen et al. |
| 7,676,499 | B2 | 3/2010 | Dorsett, Jr. |
| 7,707,206 | B2 | 4/2010 | Encina et al. |
| 7,805,437 | B1 | 9/2010 | Andersson et al. |
| 7,933,763 | B2* | 4/2011 | Lawson et al. ..................... 704/2 |
| 8,433,723 | B2 | 4/2013 | Smith et al. |
| 8,538,983 | B2 | 9/2013 | Huang et al. |
| 2002/0161599 | A1 | 10/2002 | Faerman et al. |
| 2003/0125929 | A1 | 7/2003 | Bergstraesser et al. |
| 2004/0003000 | A1 | 1/2004 | Smith et al. |
| 2004/0006742 | A1 | 1/2004 | Slocombe |
| 2004/0199494 | A1 | 10/2004 | Bhatt |
| 2004/0236740 | A1 | 11/2004 | Cho et al. |
| 2005/0102313 | A1 | 5/2005 | Levering et al. |
| 2005/0164324 | A1 | 7/2005 | Gygi |
| 2005/0226495 | A1 | 10/2005 | Li |
| 2006/0123113 | A1 | 6/2006 | Friedman |
| 2006/0277201 | A1 | 12/2006 | Dorsett |
| 2007/0016853 | A1 | 1/2007 | Abagyan et al. |
| 2007/0061084 | A1* | 3/2007 | Farnet et al. ..................... 702/19 |
| 2007/0174765 | A1 | 7/2007 | Schleppenbach et al. |
| 2007/0260583 | A1 | 11/2007 | Domine et al. |
| 2008/0004810 | A1* | 1/2008 | Boyer et al. ..................... 702/19 |
| 2008/0140616 | A1 | 6/2008 | Encina et al. |
| 2008/0188209 | A1 | 8/2008 | Dorogusker et al. |
| 2008/0228774 | A1 | 9/2008 | Hamilton et al. |
| 2009/0006411 | A1 | 1/2009 | Lele et al. |
| 2009/0030671 | A1* | 1/2009 | Kwon et al. ..................... 704/2 |
| 2009/0171975 | A1 | 7/2009 | McConnell et al. |
| 2009/0273571 | A1 | 11/2009 | Bowens |
| 2010/0070500 | A1* | 3/2010 | Cui et al. ..................... 707/736 |
| 2010/0257457 | A1 | 10/2010 | De Goes |
| 2010/0330602 | A1* | 12/2010 | Van Meir et al. .............. 435/29 |
| 2011/0143951 | A1 | 6/2011 | Thompson |
| 2011/0163944 | A1 | 7/2011 | Bilbrey et al. |
| 2011/0276589 | A1 | 11/2011 | Smith et al. |
| 2012/0019488 | A1 | 1/2012 | McCarthy |
| 2012/0078853 | A1 | 3/2012 | Huang et al. |
| 2012/0110486 | A1 | 5/2012 | Sirpal et al. |
| 2012/0173622 | A1 | 7/2012 | Toledano et al. |
| 2012/0188147 | A1 | 7/2012 | Hosein et al. |
| 2012/0197535 | A1 | 8/2012 | Goodlett et al. |
| 2012/0246228 | A1 | 9/2012 | Udezue et al. |
| 2012/0284638 | A1 | 11/2012 | Cutler et al. |
| 2012/0311038 | A1 | 12/2012 | Trinh et al. |
| 2012/0324368 | A1 | 12/2012 | Putz et al. |
| 2013/0044042 | A1 | 2/2013 | Olsson et al. |
| 2013/0218878 | A1 | 8/2013 | Smith et al. |
| 2013/0222265 | A1 | 8/2013 | Smith et al. |

OTHER PUBLICATIONS

International Search Report, PCT/US13/023442, Nov. 22, 2013, 4 pages.
Schroeder et al., A Neutral Loss Activation Method for Improved Phosphopeptide Sequence Analysis by Quadrupole Ion Trap Mass Spectrometry, Analystical Chemistry, vol. 76, No. 13, Jul. 1, 2004, pp. 3590-3598.
Written Opinion, PCT/US2013/023442, Nov. 22, 2013, 7 pages.
AxION 2 TOF MS User's Guide, PerkinElmer, 2012, 136 pages.
Algorri et al. Reconstruction of Chemical Molecules from Images, 2007 Annual International Conference of the IEEE Engineering in Medicine and Biology Society (EMBC '07), Lyon, France, Aug. 22-26, 2007, in Conjunction with the Biennial Conference of the Societe Francaise de Genie Biologique et Medical (SFGB), Aug. 22, 2007, pp. 4609-4612.
Bennett, Samsung's AllShare Play pushes pictures from phone to cloud and TV, <http://news.cnet.com/8301-1035_3-57391735-94/samsungs-allshare-play-pushes-pictures-from-phone-to-cloud-and-tv/> [retrieved Oct. 24, 2013], Mar. 6, 2012, 9 pages.
Casey et al. Optical Recognition of Chemical Graphics, Document Analysis and Recognition, 1993, Proceedings of the Second International Conference on, Tsukuba Science City, Japan, Oct. 20-22, 1993, Los Alamitos, CA, USA, IEEE Comput. Soc., Oct. 20, 1993, pp. 627-631.
Filippov et al. Optical Structure Recognition Software to Recover Chemical Information: OSRA, An Open Source Solution, Journal of Chemical Information and Modeling, vol. 49, No. 3, Mar. 23, 2009, pp. 740-743.
First Office Action for Chinese Application No. 201190000597.X, mailed May 29, 2013, 4 pages Including Translation.
Flick—Simply the easiest way to share, <http://getflick.io/> [retrieved Aug. 23, 2013], 4 pages.
Gonzalez-Villanueva et al., WallShare: A Collaborative Multi-pointer System for Portable Devices, Nov. 19, 2012, 7 pages.
International Search Report for PCT Application No. PCT/US2011/035070, mailed Oct. 6, 2011, 4 pages.
International Search Report, PCT/US2012/026574, dated Mar. 20, 2013, 4 pgs.
iTunes Preview, Flick for iPhone, iPad, and iPod touch on the iTunes App Store, <https://itunes.apple.com/us/app/flick./id644265534?mt=8> [retrieved Oct. 28, 2013], 2 pages.
Jurach, T., Microsoft Outlook Quick Start Email Guide!, 1-3 (2006).
Kim, et al, Development of a Gesture-Based Molecular Visualization Tool Based on Virtual Reality for Molecular Docking, Bull. Korean Chem. Soc. 2004, vol. 25, No. 10 pp. 1571-1574.
Layar, What is Layar?, <http://www.layar.com/features/> [retrieved Nov. 14, 2012], 7 pages.
Lorensen et al., Marching Cubes: A high resolution 3D surface construction algorithm. In: Computer Graphics, vol. 21, Nr. 4, Jul. 1987.
Lucero et al., Pass-Them-Around: Collaborative Use of Mobile Phones for Photo Sharing, CHI 2011—Session: Photo Sharing, May 7-11, 2011, Vancouver, BC, Canada, 10 pages.
Park et al. Automated Extraction of Chemical Structure Information From Digital Raster Images, Chemistry Central Journal, Biomed Central Ltd., vol. 3, No. 1, Feb. 5, 2009, pp. 1-16.
Park et al. Tunable Machine Vision-Based Strategy for Automated Annotation of Chemical Databases, Journal of Chemical Information and Modeling, vol. 49, No. 8, 2009, pp. 1993-2001.
Pering et al., Enabling Pervasive Collaboration with Platform Composition, Intel Research Santa Clara, 2009, 18 pages.
Pering et al., Spontaneous Marriages of Mobile Devices and Interactive Spaces, Communications of the ACM, Sep. 2005, vol. 48, No. 9, pp. 53-59, 7 pages.
Scheible et al., MobiToss: A Novel gesture based interface for creating and sharing mobile multimedia art on large public displays, MM'08, Oct. 26-31, 2008 Vancouver British Columbia, Canada, pp. 957-960, 4 pages.
Tsotsis, Word Lens Translates Words Inside of Images. Yes Really., <http://techcrunch.com/2010/12/16/world-lens-translates-words-inside-of-images-yes-really/> [retrieved Nov. 14, 2012], Dec. 16, 2010, 3 pages.
Valko et al., CLiDE Pro: The Latest Generation of CLiDE, a Tool for Optical Chemical Structure Recognition, Journal of Chemical Information and Modeling, vol. 94, No. 4, Apr. 27, 2009, pp. 780-787.
Weinberg et al., ZooZBeat: a Gesture-based Mobile Music Studio, NIME 2009, pp. 312-315, 4 pages.
Williams, et al., Smart Phones, a Powerful Tool in the Chemistry Classroom, Journal of Chemical Education, 2011, pp. 683-686.
Williams, et al., Mobile apps for chemistry in the world of drug discovery, Drug Discovery Today, vol. 16. No. 21/22, Nov. 2011, pp. 928-939.
Wobbrock et al, User-Defined Gestures for Surface Computing, CHI—Tabletop Gestures, Apr. 7, 2009, pp. 1083-1092.
Written Opinion for PCT Application No. PCT/US2011/035070, mailed Oct. 6, 2011, 9 pages.
Written Opinion, PCT/US2012/026574, dated Mar. 20, 2013, 8 pgs.
Australian Patent Application No. 2011248243, APO Examination Report No. 1, issued Nov. 5, 2013, 3 pages.
Shine et al, ChemPad3 a tutorial, May 21, 2008, 10 pages.

* cited by examiner

INFORMATION MANAGEMENT SYSTEM

This Application is a continuation of, claims priority to and the benefit of, and incorporates herein by reference in its entirety U.S. patent application Ser. No. 12/199,651 titled "Information Management System", which was filed on Aug. 27, 2008 and issued as U.S. Pat. No. 8,126,899.

FIELD OF THE INVENTION

The present invention relates generally to information management, and in particular to a system and method for discovering commonalities in stored information.

BACKGROUND

In the "information age," managing information is critical to the success of many organizations, such as private companies, universities, government agencies, and the like. With dramatic increases in computing power and access to vast amounts of information via networks such as the Internet, organizations amass information at an unprecedented rate. However, typically this information is poorly organized, if at all. It resides in many locations, such as on personal computers and laptops, on shared network drives, and in databases. Information is stored in often incompatible file types associated with different applications, such as spreadsheets, word processors, relational databases, and presentation programs, as well as in proprietary formats in files associated with custom applications. The information itself often takes diverse forms, such as text, graphics and images, numerical data, and the like. Given this plethora of information types, file types in which it is stored, and numerous locations in which the files reside, it is virtually impossible for any organization to sift through more than a tiny fraction of the information it has amassed, to find the information relevant to a particular subject, issue, or problem, or to discover synergies among its information resources.

Document management systems attempt to organize information by storing source files in a logical way. A typical document management system provides a plurality of subject headings under which source files containing information may be organized. Users may create sub-classes, annotate source files with descriptions of their content, and otherwise attempt to impose their own organizational structure onto the document management system. While these measures may impose a coarse order on the information, they cannot discover links between documents based on their content, only on their classification within the system and any annotations. Furthermore, even sophisticated and well-managed document management systems are typically only deployed within a department, sub-agency, or other relatively small organizational structure.

Insight and innovation often arise from unexpected synergy. However, highly relevant and related information items may remain separately classified in a traditional document management system, particularly where the synergy resides in an ancillary aspect of the information in a document. As such, it is not likely to be reflected in either the document's classification or in annotations attempting to identify or characterize it. In short, the "top down" approach to information management inherent in traditional document management systems inevitably misses critical linkages of information residing in an organization's collection of documents. Furthermore, traditional document management systems lack effective facilities for observing or tracking the organic growth of information over time—information that itself may prove enlightening.

SUMMARY

According to one or more embodiments disclosed herein, a "bottom up" relational information management system creates data structures based entirely on the content of source files, then compares these data structures to discover synergies and commonalities. In one embodiment, an information management system accepts a first set of source files, optionally transforms each source file to a corresponding archive file of a common type, parses each source file, and extracts tags from each source file. A tag may comprise a text term/phrase or a representation of an extensible object. The tags are compared to collections of tags in a hierarchical listing in one or more dictionaries. Tags in the dictionaries matching the tags extracted from source files are associated with each file and its archive file. The system then generates a virtual relational network in which each file having matching tags is a node. Tags associated with two or more source files (that is, matching the text or extensible objects in the files) are links between the nodes. This single virtual relational network may be compared with one or more other virtual relational networks created by the dictionaries to discover common nodes or links. In various embodiments, the comparison of these virtual relational networks can be time based (comparisons of differences over time), omission based (assets that are not contained in one or multiples of the compared virtual relational networks), inclusion based (assets that are only contained in one or multiples of the compared virtual relational networks), or union based (assets that are within the plurality of compared virtual relational networks). The other virtual relational network(s) may be derived from source files of another organization, or the same organization at a prior time. In one embodiment, the hierarchy of matching tags within their respective dictionaries is preserved when the tags are associated with the version controlled source files. The resulting virtual relational network is then hierarchical, with "degrees of freedom" corresponding to the hierarchical level of matching tags.

DETAILED DESCRIPTION

Figure 1:
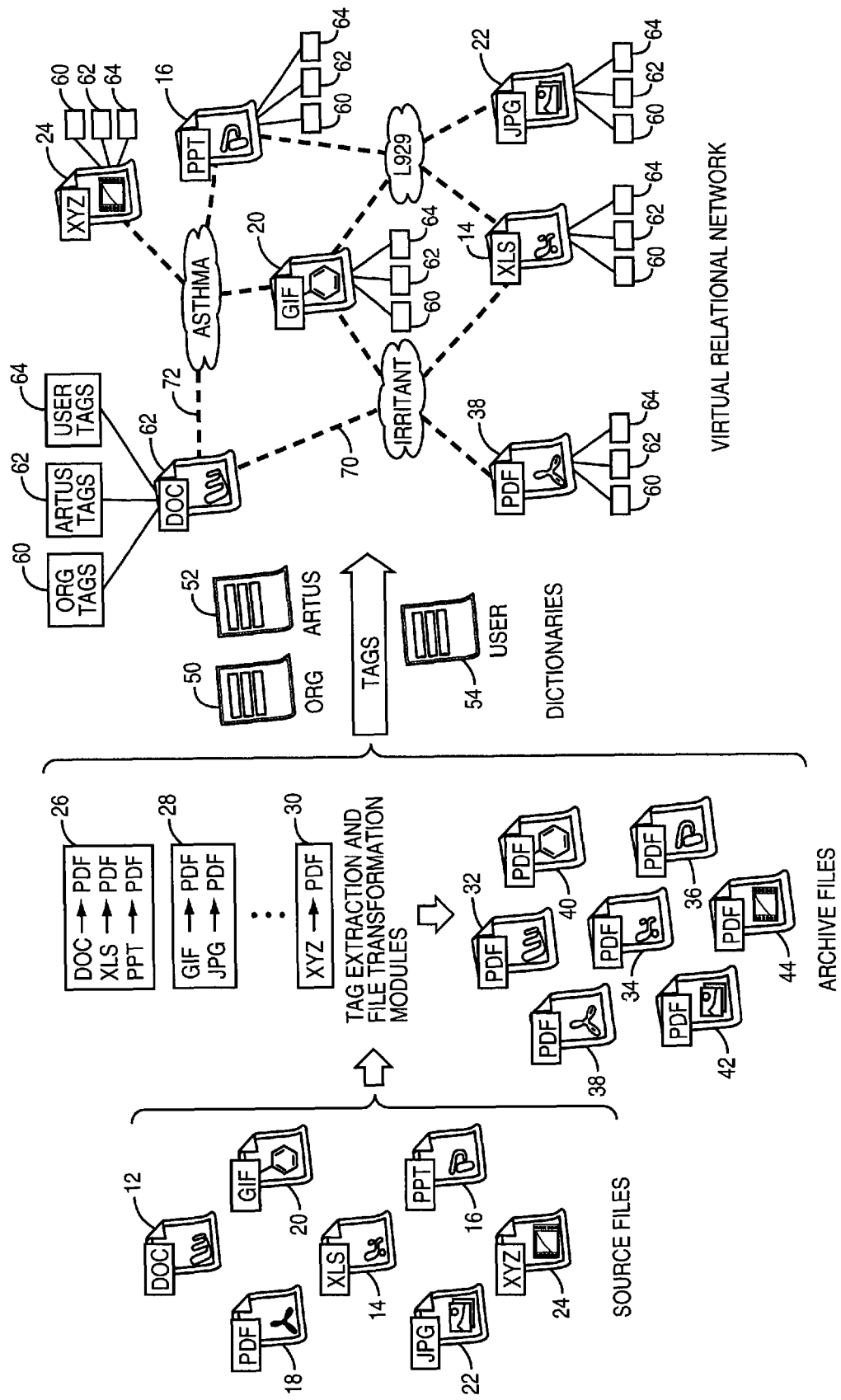
FIG. 1 is a functional block diagram of a process of creating a virtual relational network from a set of source files.
Figure 2:
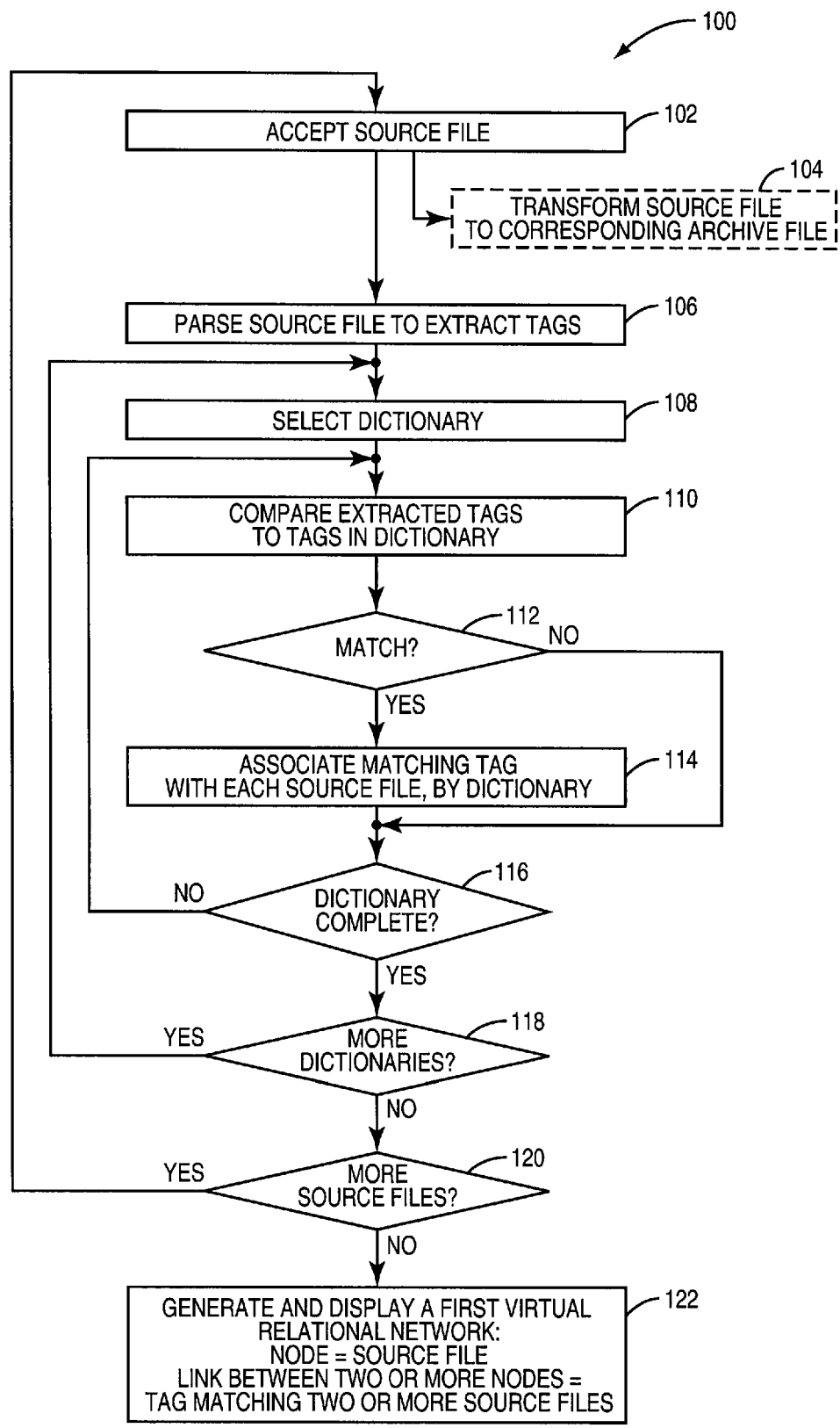
FIG. 2 is a flow diagram of a method of operating an information management system.

FIG. 1 depicts the operation of a system 10 and FIG. 2 depicts a corresponding method 100 of creating a virtual relational network of information extracted from an eclectic collection of source files 12-22. In general, the source files 12-22 may be of any type. For example, FIG. 1 depicts a source file 12 of type DOC, which may have a .doc extension to the file name in some operating systems. This source file 12 was created by, and is recognized by at least the Windows® operating system as being associated with, the Microsoft Word® word processing application. Source file 14 is an Excel® spreadsheet file of type XLS; source file 16 is a Power Point® presentation file of type PPT; source file 18 is a Portable Document File of type PDF. Of course, these source file types 12-18 that are strongly associated with particular applications are exemplary only, and not limiting. For example, source file 20 is a graphic image file of type GIF, and source file 22 is a JPEG image file of type JPG. These image formats are application-independent. Source file 24 is a proprietary format file created by a custom application; it is of a representative type XYZ, and is not associated with—or even necessarily readable by—any "standard" application. Those of skill in the art will readily recognize that a broad variety of types of source files exist. The types depicted in FIG. 1 are representative only and not limiting. In general, and as explained further herein, the present invention is applicable to any type of source file 12-24.

In prior art document management systems, all spreadsheet files may be grouped together, all word processing files, and so forth. Alternatively, source files 12-22 of different types may be grouped together under a subject heading or sub-heading. In either case, much information remains "buried" within the file—information that is not reflected in the document management system's organization of the source files 12-22.

According to one embodiment of the present invention, an information management system 10 extracts all relevant information from each source file in a collection of files, digests the information over one or more dictionaries, and creates a virtual relational network data structure based on the shared information in the source files. This virtual relational network may then be compared to other virtual relational networks (i.e., virtual relational networks generated from other collections of source files, or from the same collection of source files at a different time), to discover synergies and shared information in the corresponding source file collections.

This method 100 begins when the system 10 accepts a first source file 12 (step 102). The system 10 extracts text from the source file 12 using a tag extraction and file transformation module 26 (step 106), and transforms the source file 12 to an archive file 32 (step 104). All archive files 32-44 are of a common type. In one embodiment, the archive files 32-44 are Portable Document Files of type PDF. The PDF file format was created by Adobe Systems® in 1993 to facilitate the exchange of documents between dissimilar systems. PDF files employ a fixed-layout format to represent text, fonts, images, and vector graphic in a manner independent of application software, hardware, and operating system.

As one example, a tag extraction and file transformation module 26 compatible with the structure and format of Microsoft Word® DOC type files reads the source file 12, extracts text from it, and generates a corresponding archive file 32 of type PDF. The PDF archive file 32 contains at least all of the text in the DOC source file 12. In one embodiment, the PDF archive file 32 preserves all of the content and format of the corresponding DOC source file 12, including text, tables, graphics, and the like. However, at a minimum, the PDF archive file 32 must include the text of the corresponding DOC source file 12. The extracted text is run against dictionaries 50-54, as discussed herein.

Similarly, a tag extraction and file transformation module 26 compatible with the structure and format of Microsoft Excel® XLS type files reads the source file 14, extracts text from it, and converts it to an archive file 34 of type PDF containing all of the text in the source file 14. In the embodiment depicted in FIG. 1, a single tag extraction and file transformation module 26 "recognizes" a variety of common source file types, and performs the text extraction and file transformation tasks for, e.g., DOC, XLS, and PPT type files. A separate tag extraction and file transformation module 28 recognizes a variety of graphics file types, such as GIF and JPG. Those of skill in the art will recognize that tag extraction and file transformation modules 26-30 may each be created to recognize a plurality of different source file types, or alternatively may be dedicated to only one source file type.

In general, as many tag extraction and file transformation modules 26-30 may be added to the system 10 as necessary to extract text from all source files 12-24 in a source file collection, and translate the source files 12-24 to archive files 32-44. These text extraction and file transformation modules 26-30 may have user-settable parameters—for example, an XLS-to-PDF transformation module may save cell equations from an XLS source file 14 in a PDF archive file 34, or alternatively may evaluate the equations for each cell and save the resulting value in the archive file 34. In the case of image files such as GIF source file 20 or JPG source file 22, the tag extraction and file transformation module 28 may perform Optical Character Recognition (OCR), and/or may employ sophisticated algorithms, to extract text from the source files 20, 22.

Tag extraction and file transformation modules 26-30 make the system 10 extensible, and able to accept any type of source file 12-24. For example, a custom tag extraction and file transformation module 30 may be written to accept the type XYZ source file 24 (step 102), extract text from it (step 106), and generate to a corresponding PDF archive file 44 (step 104).

Text terms are one form of tag extracted from source files 12-24 by tag extraction and file transformation modules 26-30. Another form of tag recognized by the system 10 is an embedded object (or representation thereof). As known in the art, an embedded object is an object created with one application and embedded into a document or other source file created by a different application. An embedded object is distinct from information merely inserted into the source file in that the embedded object retains its original format. The embedded object may be read and modified by the application that created it. One known technology that facilitates the use of embedded objects is Object Linking and Embedding (OLE) from Microsoft Corporation.

Tags in the form of representations of embedded objects are extracted by a tag extraction and file transformation module that recognizes and is able to parse a source file 12-24, but also recognizes and is able to parse the embedded objects embedded therein. As an example, a source file 14 of Microsoft Excel® XLS type may contain one or more chemical structure objects. The chemical structure objects may have been created by a chemical drawing application. The tag extraction and file transformation module 26 that extracts text from XLS type source files 14 may include the ability to recognize and parse chemical structure objects. The parsed chemical structure objects may be maintained in a chemical molecule structure database associated with the source file. The chemical structure (whatever its representation in the database) may also be a tag in a dictionary 50-54, as discussed further herein. Other example of embedded objects include a DNA sequence, an audio sample, a video clip, or any other self-contained object embedded within a source file 12-24. The ability to recognize and extract some embedded object tags may be included in "standard" tag extraction and file transformation modules 26, 28. Other embedded object tags may require a custom tag extraction and file transformation module 30, capable of both parsing the relevant source file 12-24 type(s) to extract text tags, and also parsing the relevant embedded object tags, as well as creating an archive file 32-44 containing at least the text tags in the source file 12-24.

Note that, while archive files 32-44 are generated in a preferred embodiment of the present invention, this step is not strictly necessary for the generation of virtual relational networks, as described herein. Accordingly, FIG. 2 depicts step 104 in dashed lines, indicating that the step is optional. Additionally, step 106 is not within the primary flow of the method 100.

Once a source file 12-24 has been accepted (step 102) and its tags (whether text terms or embedded objects) extracted (step 106), a dictionary 50, 52, 54 is selected (step 108), and the extracted tags are compared to tags in the selected dictionary 50-54 (step 110). As used herein, a dictionary 50-54 is a hierarchical list of tags (text terms or embedded objects). Hierarchical dictionaries—or taxonomies—are well known in the scientific and information science arts. For example, a dictionary derived from the classic categorization of living things may comprise five Kingdoms (Animalia, Plantae, Protista, Fungi, and Monera). Under each Kingdom are several Phyla, under each of which may be numerous Classes, then Order, Family, Genus, and Species. At each hierarchical level are numerous tags—text terms or embedded objects (or parsed representations of embedded objects) related to the concept classified at that level.

The tags extracted from the source file 12 are compared to the tags in the selected dictionary 50-54 (step 110). Each tag from the dictionary 50-54 that matches a predetermined number of the extracted tags (step 112) is associated with the source file 12 (step 114). This process completes until the entire dictionary 50-54 has been searched (step 116). In one embodiment, the matching tags from a selected dictionary 50-54 are collected together and associated with the source file 12.

In one embodiment, two or more dictionaries 50-54 may be provided. For example, a library of tags specific to a particular art area (e.g., chemistry, electronics, life sciences, biology, or the like) may be provided with the system 10. Such a dictionary 52, denoted ARTUS in FIG. 1, may be provided by ArtusLabs, Inc. of Durham, N.C., assignee of the present application, and providers of the information management system described herein. In addition, an organization may create their own dictionary 50, containing a hierarchical listing of tags specific to their organization, business, mission, or the like. Furthermore, each individual user may create his or her own dictionary 54. After the extracted text has been matched to the first dictionary 50-52 selected, if additional dictionaries 50-54 remain (step 118), the next dictionary 50-54 is selected (step 108) and processed similarly. When all dictionaries have been searched (step 118), the process repeats by accepting the next source file 14 (step 102) and processing it.

As mentioned above, the matching tags from a selected dictionary 50-54 may be collected together and associated with the source file 12. This is depicted in FIG. 1 as the ORG tags 60, ARTUS tags 62, and USER tags 64 associated with the source file 12. These blocks contain all of the tags from the ORG dictionary 50, ARTUS dictionary 52, and USER dictionary 54, respectively, that matched tags extracted from the source file 12. Similar tag collections 60-64 are associated with each source file 12-24 having that matched any tags in the dictionaries 50-54. The tag collections 60-64 are expanded and labeled in FIG. 1 only for source file 12 for clarity of presentation.

When all of the source files 12-24 of a collection have been processed, the system 10 generates and displays a virtual relational network data structure (step 122). The virtual relational network comprises a plurality of nodes, wherein each node comprises a source file 12-24, the tags extracted from which matched at least one tag in a dictionary 50-54. The nodes are connected by links 70, 72—depicted by dashed lines in FIG. 1—wherein each link between two or more nodes comprises a tag from at least one dictionary 50-54 that matched tags extracted from at least two source files 12-24. For example, the link 70, which is the tag IRRITANT, connects nodes 12, 24, 18, and 20. That is, the text tag IRRITANT, which may have matched from any dictionary 50-54, matched at least one tag extracted from each of the source files 12, 24, 18, and 20. Similarly, the link 72, which is the text tag ASTHMA, connects nodes 12, 16, 20, and 24, as that tag matched text tags extracted from those source files.

In one embodiment, the system 10 displays the virtual relational network (step 122) as a network, as depicted in FIG. 1. In this example, the links 70 and 72 both connect to both node 12 and node 20. This may indicate that the corresponding source files 12, 20 may both contain information relevant to a topic in which ASTHMA and IRRITANT are important terms. In this case, source file 12 was a Microsoft Word® DOC files containing these terms, and source file 20 was a GIF image from which these terms were extracted. It is virtually impossible that any prior art document management system could discover this commonality between the two source files 12, 20. Accordingly, the synergy that may be gained from this insight by examining the source files 12, 20 together, is simply not achievable from any prior art system.

Conceptually, the virtual relational network may be considered to have the inverse functionality of a traditional relational database. In a relational database, a user defines fields for each database entry. Data in the database entries are then related via the respective pre-defined fields. In contrast, the links that relate source files 12-24 in the virtual relational network are not pre-defined, but rather are generated from the data itself (i.e., the tags in the source files 12-24 and those in the dictionaries 50-54). Because the links 70, 72 that define the relationships between the source files 12-24 are generated organically from the data, they expose relationships that may never have occurred to a user defining fields for a traditional relational database.

The strongest possible indication that data are related is an explicit indication of this fact by a user. For example, if a user encounters information in a file, and adds it to a source file collection, this action is a strong indicator that the user deems the information relevant to the subject matter of the source file collection. Accordingly, in one embodiment, when a new source file is added to a collection, the tags 60-64 associated with all source files 12-24 in the collection are associated with the newly-added the source file. This creates a "massively linked" node representing the newly-added source file that is linked to every other source file 12-24 in the virtual relational network representing the source file collection. In another embodiment, if the newly-added a source file itself has tags 60-64 associated therewith—such as, for example, if the source file has been run against one or more dictionaries 50-54—then the tags associated with the newly-added source file are additionally associated with every other source file 12-24 in the collection. In these embodiments, the fact that an individual manually added a new source file to an existing collection is taken as a strong indication that the new source file is highly relevant to the subject of the collection. In this case, a complete association with the collection is ensured, regardless of the degree of association (e.g., the strength of linking in the virtual relational network) that would arise organically by running the collection, including the new source file, against the dictionaries 50-54.

Figure 3:
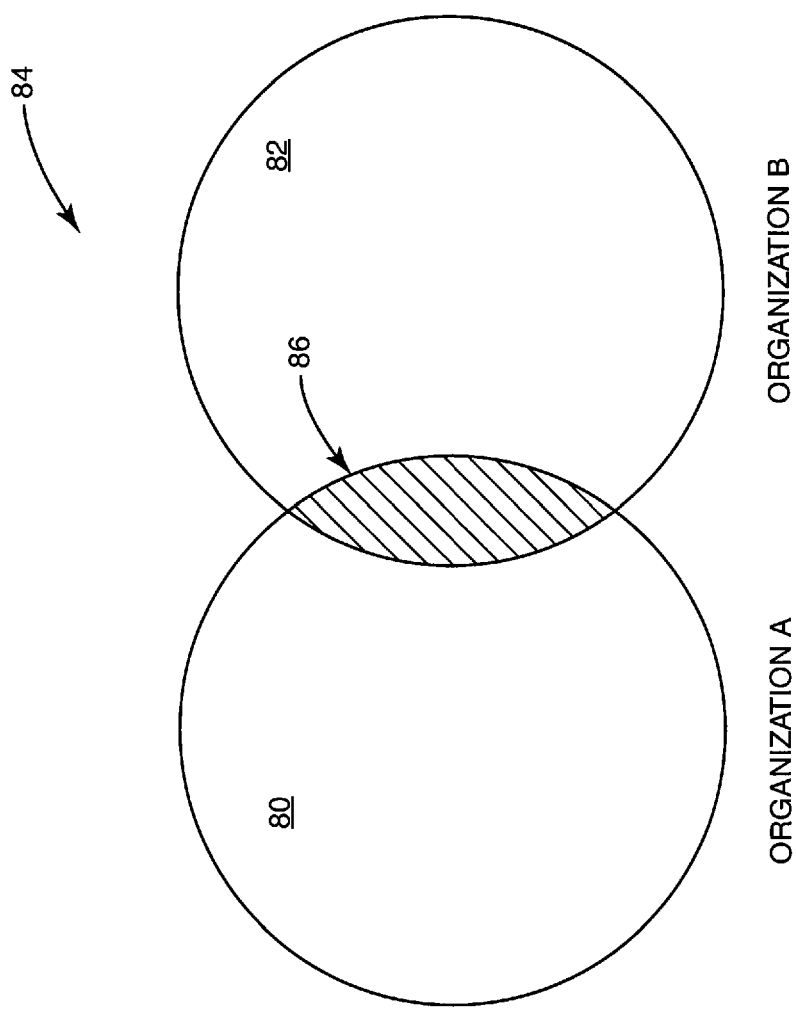
FIG. 3 is a Venn diagram view of a merged virtual relational network.

In one embodiment, the power of the information management system 10 of the present invention is further expanded by the ability to compare two or more virtual relational networks, as depicted in FIG. 3. Two different organizations may organize their information into virtual relational networks 80, 82 by processing their separate source files 12-24 over the same dictionaries 50-54, as described above. The system 10 may then display a merged virtual relational network 84 comprising the two virtual relational networks 80, 82, as they join by sharing nodes and/or links. The system 10 preferably visually indicates the shared area of the merged virtual relational network 84, such as by highlighting the intersection 86 in a Venn diagram, as depicted in FIG. 3. In other embodiments, the shared area of the merged virtual relational network 84 may be indicated by highlighting components of a network diagram (similar to that depicted in FIG. 1).

As one example of a common area, the same node(s) may be common to both virtual relational networks, but connected to each virtual relational network by different links. This would indicate these same source file 12-24 exists in both organizations' information store, but that they link to other source files by matching different terms in one or more dictionaries 50-54. As another example, the two virtual relational networks 80, 82 may be joined by one or more common links. This would indicate that different source files 12-24 reside in each organization's information store, but that text from one or more source file 12-24 in each organization matches the same tag from one or more dictionaries 50-54. In either case, users may wish to examine source files 12-24 and subject matter, as indicated by matching tags, in the common areas of the two virtual relational networks 80, 82 to exploit synergies.

FIG. 3 depicts a union comparison of two virtual relational networks 80, 82. Another comparison may be omission based—displaying the parts of each virtual relational networks 80, 82 not included in the other. Still another comparison may be inclusion based—displaying nodes that are only contained in one or more of the virtual relational networks 80, 82.

Another powerful application of the comparison ability of the information management system 10 is its use to track the organic growth of an organization's information over time. For example, an organization may periodically create a virtual relational network representing its information store. Comparing these virtual relational networks by displaying a merged virtual relational network will indicate changes to the information store by areas that are not common to both webs. Alternatively, virtual relational networks may be created from the same information store, using different dictionaries. This may yield insight into changes in the focus or emphasis of the organization's data mining, as reflected by the evolution of its dictionaries 50-54—particularly the ORG and/or USER dictionaries 50, 54.

The information management system 10 of the present invention may be implemented as software modules, for example, as a front end to a database application. Additionally or alternatively, component functions of the information management system 10 may be implemented as dedicated hardware, programmable hardware with associated firmware, or any combination of hardware, firmware, and software, as known in the art or as may be developed in the future. In particular, functional modules of the information management system 10 of the present invention may be implemented as software modules stored on a computer-readable medium, such as optical or magnetic media, or transferred across a data communication network, such as the Internet.

Those of skill in the art will recognize that the specific order of steps in the process 100 may change in different embodiments. For example, all source files 12-24 may be translated to archive files 32-44 in a "batch" process. All such variations are within the broad scope of the present invention.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating an information management system, comprising:
   for each source file in a first collection of source files:
      parsing, by a processor of a computing device, the respective source file to extract one or more chemical structures,
      comparing, by the processor, the one or more chemical structures to chemical structures stored in at least one dictionary, wherein
         each dictionary of the at least one dictionary comprises a hierarchical listing of chemical structures, and
         comparing comprises identifying one or more matching chemical structures, and
      associating, by the processor, with the respective source file, the one or more matching chemical structures;
   generating, by the processor, a first virtual relational network comprising the source files in the first collection, wherein the first virtual relational network comprises:
      one or more nodes, wherein each node represents a particular matching chemical structure of the one or more matching chemical structures associated with a particular source file of the source files in the first collection, and
      one or more links, wherein each link represents a connection between a pair of nodes, wherein each node of the pair of nodes is associated with a common chemical structure; and
   comparing, by the processor, the first virtual relational network to a second virtual relational network, wherein comparing comprises identifying at least one of a) one or more nodes and b) one or more links common to both the first virtual relational network and the second virtual relational network, wherein
      the second virtual relational network is created from a second collection of source files different than the first collection of source files; and
      the first virtual relational network and the second virtual relational network share at least one common dictionary, wherein
         the at least one dictionary comprises the at least one common dictionary.

2. The method of claim 1, wherein the chemical structures are contained within embedded objects.

3. The method of claim 1, wherein parsing the respective source file to extract the one or more chemical structures comprises:
   identifying a source file type; and
   inputting the respective source file to a software module that recognizes the source file type.

4. The method of claim 1, wherein associating the one or more matching chemical structures comprises, for each dictionary of the at least one dictionary, associating the one or more matching chemical structures from the respective dictionary with the respective source file as a separate set of chemical structures.

5. The method of claim 1, further comprising, for each source file in the collection, transforming the respective source file to a respective archive file of a common file type.

6. The method of claim 5, wherein the common file type is a text-readable Portable Document Format (PDF).

7. The method of claim 1, further comprising, after generating the first virtual relational network:
adding a new source file to the first collection;
parsing the new source file to extract one or more additional chemical structures;
associating, with the new source file, the one or more additional chemical structures; and
regenerating the first virtual relational network, wherein regenerating comprises including the new source file in the first virtual network.

8. The method of claim 1, wherein associating the one or more matching chemical structures with the respective source file further comprises associating a respective hierarchical level of each chemical structure of the one or more matching chemical structures with the respective source file, wherein the respective hierarchical level relates to a hierarchical level of the respective chemical structure within a particular dictionary of the at least one dictionary in which the respective chemical structure resides.

9. The method of claim 8, wherein generating the first virtual relational network comprises generating a hierarchical network corresponding to the hierarchical levels of the one or more matching chemical structures of each respective source file of the first collection of source files.

10. The method of claim 1, further comprising causing, by the processor, a graphic representation of at least a portion of one or more of the a) one or more nodes and b) one or more links common to both the first virtual relational network and the second virtual relational network to be displayed on a computer display.

11. The method of claim 10, wherein the graphic representation comprises a plurality of graphic links, wherein:
each graphic link of the plurality of graphic links corresponds to a respective link common to both the first virtual relational network and the second virtual relational network, and
each graphic link is configured, upon display, to visually indicate an associated dictionary of the at least one dictionary, wherein a particular matching chemical structure of the one or more matching chemical structures associated with the respective link resides within the associated dictionary.

12. The method of claim 10, wherein the graphic representation comprises a Venn diagram.

13. The method of claim 1, wherein the second collection of source files is associated with a different entity than an entity associated with the first collection of source files.

14. The method of claim 1, wherein the first collection of source files is associated with an entity at a first time, and the second collection of source files is associated with the same entity at a later time.

15. The method of claim 1, wherein each source file comprises a file type selected from the group consisting of a word processing file, a spreadsheet file, a presentation file, a Portable Document Format file, an image file, and a proprietary format file.

16. A non-transitory computer readable medium having instructions stored thereon, wherein the instructions, when executed by a processor, cause the processor to for each source file in a first collection of source files:
parse the respective source file to extract one or more chemical structures,
compare the one or more chemical structures to chemical structures stored in at least one dictionary, wherein
comparing the one or more chemical structures comprises identifying one or more matching chemical structures, and
each dictionary of the at least one dictionary comprises a hierarchical listing of chemical structures;
associate, with the respective source file, the one or more matching chemical structures;
generate a first virtual relational network comprising the source files in the first collection, wherein the first virtual network comprises:
one or more nodes, wherein each node of the one or more nodes represents a particular matching chemical structure of the one or more matching chemical structures associated with a particular source file of the source files in the first collection, and
one or more links, wherein each link represents a connection between a pair of nodes, wherein each node of the pair of nodes is associated with a common chemical structure; and
compare the first virtual relational network to a second virtual relational network, wherein comparing comprises identifying at least one of a) one or more nodes and b) one or more links common to both the first virtual relational network and the second virtual relational network, wherein
the second virtual relational network is created from a second collection of source files different than the first collection of source files; and
the first virtual relational network and the second virtual relational network share at least one common dictionary, wherein
the at least one dictionary comprises the at least one common dictionary.

17. The computer readable medium of claim 16, wherein the one or more chemical structures are contained within embedded objects.

18. The computer readable medium of claim 16, wherein the instructions comprise at least one software module, wherein each software module of the at least one software module is configured, upon execution by the processor, to parse one or more source files in the first collection and to extract chemical structures therefrom.

19. The computer readable medium of claim 18, wherein each software module of the at least one software module is further configured, upon execution by the processor, to transform each source file of the one or more source files to a respective archive file of a respective common file type.

20. The computer readable medium of claim 16, wherein the instructions, when executed, cause the processor to:
after generating the first virtual relational network,
add a new source file to the first collection,
parse the new source file to extract one or more additional chemical structures,
associate, with the new source file, the one or more additional chemical structures, and
regenerate the first virtual relational network, wherein regenerating comprises including the new source file in the first virtual network.

21. The computer readable medium of claim 16, wherein the instructions, when executed, cause the processor to cause a graphic representation of at least a portion of one or more of the a) one or more nodes and b) one or more links common to both the first virtual relational network and the second virtual relational network to be displayed on a computer display.

22. The computer readable medium of claim 16, wherein each source file comprises a file type selected from the group consisting of a word processing file, a spreadsheet file, a presentation file, a Portable Document Format file, an image file, and a proprietary format file.

\* \* \* \* \*